(12) United States Patent
Verhoog et al.

(10) Patent No.: US 9,127,721 B2
(45) Date of Patent: Sep. 8, 2015

(54) TORSIONAL DAMPER FOR CLUTCH

(75) Inventors: Roel Verhoog, Gournay sur Aronde (FR); Michael Hennebelle, Houdain (FR)

(73) Assignee: VALEO EMBRAYAGES, Amiens Cedex (FR)

( * ) Notice: Subject to any disclaimer, the term of this patent is extended or adjusted under 35 U.S.C. 154(b) by 39 days.

(21) Appl. No.: 14/001,423

(22) PCT Filed: Feb. 24, 2012

(86) PCT No.: PCT/FR2012/050390
§ 371 (c)(1),
(2), (4) Date: Nov. 5, 2013

(87) PCT Pub. No.: WO2012/114050
PCT Pub. Date: Aug. 30, 2012

(65) Prior Publication Data
US 2015/0038243 A1 Feb. 5, 2015

(30) Foreign Application Priority Data

Feb. 25, 2011 (FR) ...................................... 11 51534

(51) Int. Cl.
| F16F 15/121 | (2006.01) |
| F16D 3/12 | (2006.01) |
| F16F 15/123 | (2006.01) |
| F16D 3/66 | (2006.01) |

(52) U.S. Cl.
CPC .. *F16D 3/12* (2013.01); *F16D 3/66* (2013.01); *F16F 15/1217* (2013.01); *F16F 15/1232* (2013.01)

(58) Field of Classification Search
CPC .......... F16D 3/12; F16D 3/66; F16F 15/1217
USPC ............. 464/68.1, 68.4, 68.41; 192/212, 214, 192/214.1
See application file for complete search history.

(56) References Cited

U.S. PATENT DOCUMENTS

| 4,662,239 | A | * | 5/1987 | Worner et al. ................ 464/68.4 |
| 5,401,213 | A | * | 3/1995 | Muchmore et al. ......... 464/68.41 |
| 5,697,846 | A |   | 12/1997 | Uenohara |
| 5,984,789 | A | * | 11/1999 | Reik et al. .................. 192/212 X |
| 6,364,776 | B1| * | 4/2002 | Young ........................... 464/68.1 |

FOREIGN PATENT DOCUMENTS

| CN | 1120637 A | 4/1996 |
| CN | 201265614 Y | 7/2009 |
| FR | 2514446 | 4/1983 |
| FR | 2940825 | 7/2010 |

* cited by examiner

*Primary Examiner* — Gregory Binda
(74) *Attorney, Agent, or Firm* — Berenato & White, LLC

(57) ABSTRACT

A torsional damper (1) comprises a hub (2) coupled to a radial annular web (6); two guide washers; elastic members (9); and friction means, relative angular deflections of the guide washers and the annular web (6) being limited in a first rotation direction (D) by a first series of stops (23) of the guide washers that interact with a first series of protruding parts (25) of the annular web (6), and in a second rotation direction (R) by a second series of stops (24) of the guide washers that interact with a second series of protruding parts (26) of the annular web (6).

15 Claims, 4 Drawing Sheets

TORSIONAL DAMPER FOR CLUTCH

CROSS-REFERENCE TO RELATED APPLICATIONS AND CLAIM TO PRIORITY

This application relates to International Application No. PCT/FR2012/050390 filed Feb. 24, 2012 and French Patent Application No. 1151534 filed Feb. 25, 2011, of which the disclosures are incorporated herein by reference and to which priority is claimed.

FIELD OF THE INVENTION

The present invention relates to a torsional damper for a clutch disk or a dual mass flywheel, in particular of an automobile.

BACKGROUND OF THE INVENTION

A torsional damper comprises a hub coupled to a radial annular web; two guide washers that extend radially on either side of the annular web and are connected fixedly to one another and are movable rotationally with respect to the hub and the annular web; and elastic members and friction means mounted between the guide washers and the annular web in order to absorb and damp vibrations and rotational irregularities.

The hub is generally coupled to an input shaft of a gearbox, and a clutch disk equipped with friction linings, or a flywheel, is coupled to the guide washers.

The elastic members are most often helicoidal springs arranged circumferentially between the annular web and the guide washers. The maximum angular deflection between the web and the guide washers is reached when the spring windings are contiguous. If the torque transmitted by the torsional damper is too great, the windings experience compression, causing fatigue and premature wear on the springs.

To prevent this, the Applicant's patent application FR 2 514 446 proposes to limit the angular deflection between the web and the guide washers in both rotational directions, respectively the forward direction and the reverse direction. For this, oblong openings are provided in one of the guide washers, and pegs extend through said openings from the outer periphery of the web. Deflection is thus limited by abutment of the pegs against each of the ends of the openings.

Above a stipulated torque, and regardless of the direction of rotation, the pegs thus come into abutment against the ends of the openings and torque is transmitted directly from the guide washers to the web.

The position and length of the openings is in this case limited, however, so that the guide washers have sufficient strength. In particular, the openings must not overlap notches that serve to crimp the washers onto one another.

The angular deflection between the washers and the web allowed by such a structure is thus limited.

In the document FR 2 736 112, one of the guide washers comprises a crown having elements protruding radially inward, the outer periphery of the web having cutouts whose edges form support surfaces located on either side of the protruding elements and intended to come into abutment against them in each rotation direction.

If the cutouts are formed above the springs, the latter must be brought closer to the central hub. If the cutouts are formed not above the springs but on either side thereof, the length of the springs must necessarily be reduced. In both cases, the performance of the torsional damper is reduced.

The object of the invention is in particular to provide a simple, effective, and economical solution to these problems.

SUMMARY OF THE INVENTION

It proposes for this purpose a torsional damper for a clutch, in particular of an automobile, comprising a hub coupled to a radial annular web; two guide washers extending radially on either side of the annular web and connected fixedly to one another and movably rotationally with respect to the hub and the annular web; and elastic members and friction means mounted between the guide washers and the annular web in order to absorb and damp vibrations and rotational irregularities, relative angular deflections of the guide washers and the annular web being limited by stops of the guide washers that become supported against protruding parts of the annular web, the guide washers and the annular web each comprising a first series of stops that mutually interact in order to limit the relative angular deflection in a first rotation direction, and a second series of stops that mutually interact in order to limit the relative angular deflection in a second rotation direction opposite to the first, the stops of the first series being different from the stops of the second series.

The use of two separate series of stops for the two rotation directions allows a significant increase in the deflection possible between the guide washers and the annular web.

Advantageously, the stops of the first series and the stops of the second series are formed by separate protruding elements.

Advantageously, the separate protruding elements forming the stops of the first series and the stops of the second series extend substantially in the axial direction.

Advantageously, the first and the second series of stops are arranged in such a way that an angular sector defined by the travel of the stops of the guide washers of the first series with respect to the annular web between the inactive position and a first extreme position, and an angular sector defined by the travel of the stops of the guide washers of the second series with respect to the annular web between the inactive position and a second extreme position, at least partially overlap. According to a characteristic of the invention, the aforesaid stops are represented by parts that are added onto the guide washers or onto the annular web.

The added parts can thus easily be replaced in the event of wear or depending on the application. The same web and/or the same guide washers can then be used for applications requiring, for example, different deflections.

Preferably the added parts are secured, for example by rivets, on at least one of the guide washers, and the stops of the annular web are formed by protruding parts of the annular web.

In an embodiment of the invention, one of the guide washers carries all the added parts having the stops of the first series, and the other guide washer carries all the added parts having the stops of the second series.

In another embodiment of the invention, the added parts are all secured on the same guide washer, each added part comprising a stop of the first series and a stop of the second series offset circumferentially and radially with respect to the stop of the first series.

In a first embodiment, the added parts are flat parts that are press-formed and have bent tabs forming the aforesaid stops.

In a variant embodiment, the added parts are parts that are shaped by stamping or machining and have local thickened areas forming the aforesaid stops.

The added parts are preferably in the form of an angular sector whose radial edges constitute support surfaces for the elastic members of the damper.

Lastly, the maximum angular deflection starting from an inactive position in one rotation direction can be different from the maximum angular deflection starting from the inactive position in the other rotation direction, and is on the order of 10° to 40°.

The invention will be better understood, and other details, characteristics, and advantages of the invention will emerge, upon reading the description below, provided as a non-limiting example referring to the attached drawings, in which:

DETAILED DESCRIPTION

Figure 1:
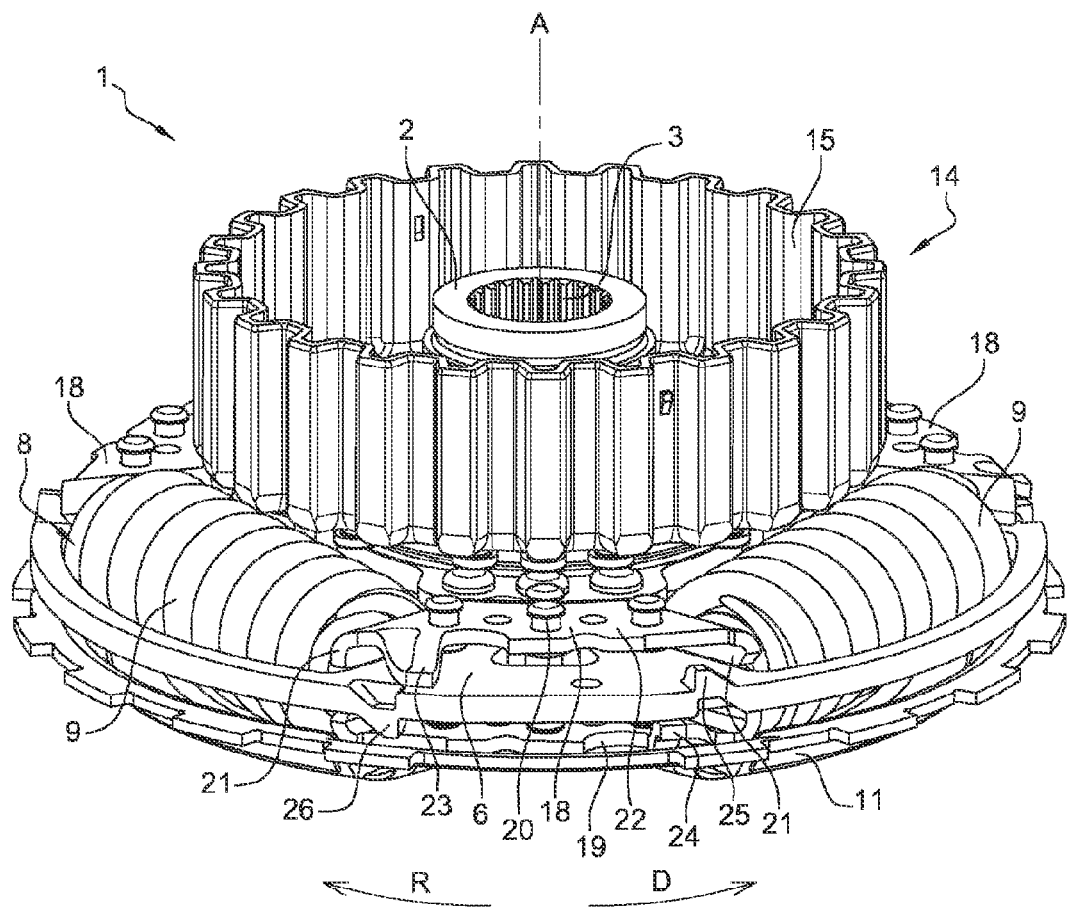
FIG. 1 is a perspective view of a torsional damper according to the invention, in which the guide washers have been removed.
Figure 2:
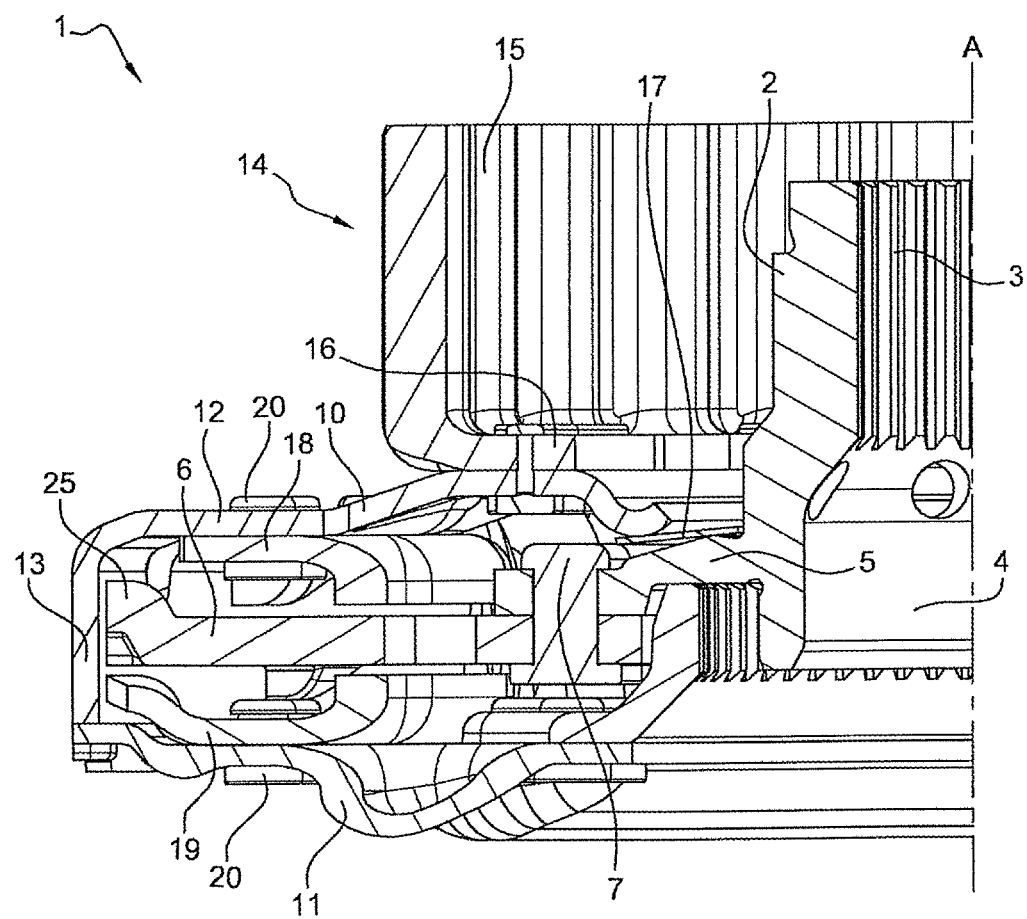
FIG. 2 is a partial cross-sectional view of the torsional damper according to the invention.
Figure 3:
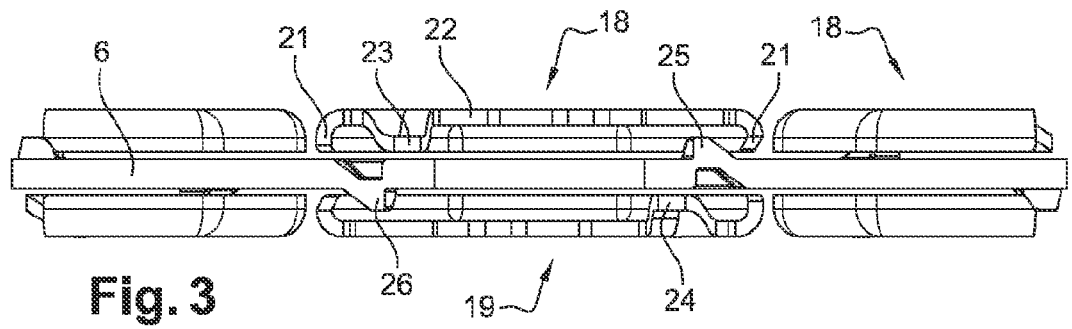
FIGS. 3 and 4 are plan views of the connecting web and of the added parts, respectively in the inactive position and in the maximum deflection position of the torsional damper.
Figure 4:
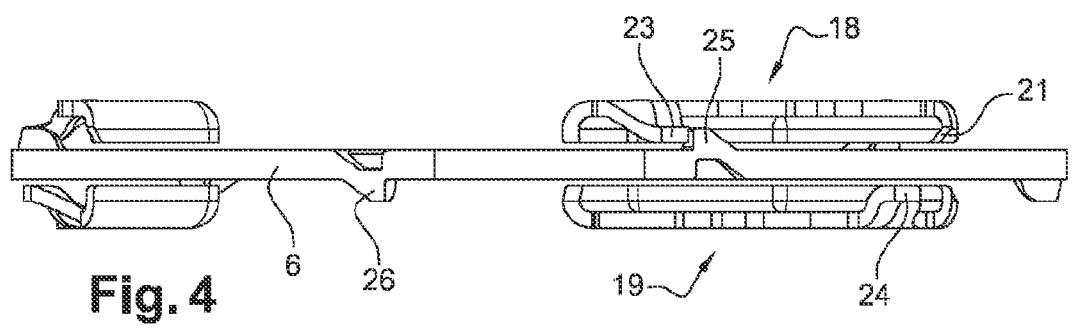

FIGS. 1 and 2 depict a torsional damper 1 for a clutch disk, in particular of an automobile, comprising a cylindrical central hub 2 having an axis A, the inner surface of which has a first fluted part 3 for connecting it to a driven shaft such as the input shaft of a gearbox of a vehicle, first fluted part 3 being extended by a second smooth part 4 having a larger diameter. An annular flange 5 extends radially outward from second part 4 of hub 2.

A substantially planar radial annular web 6 is mounted around hub 2 and is supported axially against flange 5. Web 6 is secured to said flange 5 by means of rivets 7. Web 6 has three windows 8 intended to accommodate helicoidal springs 9 (three in number in the example depicted) that extend circumferentially and are distributed around axis A'.

Torsional damper 1 furthermore has a first and a second guide washer 10, 11 disposed on either side of annular web 6. First guide washer 10, located alongside first part 3 of hub 2, has a substantially radial annular part 12 extended by a cylindrical flange 13 that proceeds substantially axially as far as second guide washer 11. The latter is of annular shape and extends substantially radially.

First guide washer 10 is crimped, at the axial end of flange 13, onto the outer periphery of second guide washer 1 in order to form, with said second guide washer 11, a receptacle for springs 9. This receptacle 13 is capable of retaining a viscous lubricant, such as grease or oil, around springs 9, in particular preventing said lubricant from escaping in response to a centrifugal force.

A connecting member 14 is moreover secured on the outer surface of first guide washer 10 around hub 2. Connecting member 14 has a globally cylindrical part 15 exhibiting flutes, extended by a radial annular rim 16 secured by rivets to first guide washer 10. Connecting member 14 is intended to be rotationally coupled to a "lock-up" of a torque converter.

A friction member 17 is disposed axially between the first guide washer 10 and the hub 2.

Torsional damper 1 thus has two parts movable with respect to one another and capable of pivoting over a determined angular range, i.e. guide washers 10, 11 and connecting member 14 on the one hand, and annular web 6 and hub 2 on the other hand.

As is known per se, the springs 9 and the friction member 17 make it possible to absorb and damp vibrations and rotational irregularities.

The discussion below with address limitation of the angular deflection between the two movable parts recited above.

As is evident from FIGS. 1 to 4, two groups of three added parts 18, 19, in the shape of angular sectors, are secured on the guide washers on either side of annular web 6 by means of rivets 20. Added parts 18, 19 are present as press-formed sheet-metal parts, and are mounted circumferentially between springs 9.

More particularly, in the embodiment of FIGS. 1 to 4 each added part 18, 19 has two radial edges 21 curved inward, i.e. toward the annular web, as well as a substantially planar middle region 22 that is secured to the corresponding guide washer 10, 11.

Each spring 9 is supported against curved lateral edges 21 of added parts 18, 19.

Springs 9 can of course also be supported against the ends of windows 8 of annular web 6, as is already the case in the existing art.

The middle region (or zone) 22 exhibits radially inner and outer peripheries that are curved. The radially outer periphery of each added part 18, 19 has a tab (or stop) 23, 24 bent inward, i.e. toward the annular web 6, and extending substantially in the axial direction. As illustrated in FIGS. 1-4, one of the guide washers (10) carries all the added parts (18) having the stops (23), while the other guide washer (11) carries all the added parts (19) having the stops (24).

The outer periphery of the annular web 6 comprises protruding studs (or parts) 25, 26 that extend axially on either side of the web 6 and are produced by deformation. More particularly, the annular web 6 has three protruding studs 25 extending toward the first washer 10, distributed evenly over the outer periphery and intended to form stops for tabs (or stops) 23 of three added parts 18 secured on the first guide washer 10, in order to limit the angular deflection between the first guide washer 10 and the connecting web 6 in a first rotation direction hereinafter called the "forward" direction (arrow D in FIG. 1). The first extreme position is defined as that position in FIG. 4 in which the tabs 23 of the added parts 18 secured to the first guide washer 10 are in abutment against the corresponding studs 25.

Annular web 6 furthermore has two studs 26 extending toward second washer 11, distributed evenly over the outer periphery and intended to form stops for tabs 24 of the three added parts 19 secured on second guide washer 11, in order to limit the angular deflection between guide washer 11 and connecting web 6 in a second rotation direction hereinafter called the "reverse" direction (arrow R in FIG. 1). The second extreme position is defined as that position in which tabs 24 of added parts 19 secured to second guide washer 11 are in abutment against the corresponding studs 26.

The positions of tabs 23, 24 and of studs 25, 26 are determined so that the maximum angular deflection (or travel) between the two aforesaid extreme positions is between 20 and 80°, for example in the case of a damper having three springs disposed on the same radius. The maximum angular deflection is close to the angle formed between the two adjacent ends of two successive springs. Accordingly, the maximum angular deflection in any one of the rotation directions starting from an inactive position to the extreme position is on the order of 10° to 40°. Moreover, the maximum angular deflection starting from an inactive position to the extreme position in one rotation direction can be different from the maximum angular deflection starting from the inactive position to the extreme position in the other rotation direction.

The "inactive position" is defined as that position of damper 1 in which guide washers 10, 11 are not subjected to an input torque. This inactive position is the one depicted in FIGS. 1 and 3.

The deflection between guide washers 10, 11 and annular web 6 between the inactive position and the first extreme position is equal to the deflection between the inactive position and the second extreme position. The sum of the two deflections is equal to the total angular deflection. Moreover, the first and the second series of stops are arranged in such a way that an angular sector defined by the travel of the stops 23, 25 of the guide washers 10, 11 of the first series with respect to the annular web 6 between the inactive position and the first extreme position, and an angular sector defined by the travel of the stops 24, 26 of the guide washers 10, 11 of the second series with respect to the annular web 6 between the inactive position and a second extreme position, at least partially overlap. These two deflections can be different depending on the application. In other words, the maximum angular deflection starting from an inactive position to the first extreme position can be different from the maximum angular deflection starting from the inactive position to the second extreme position.

Figure 5:
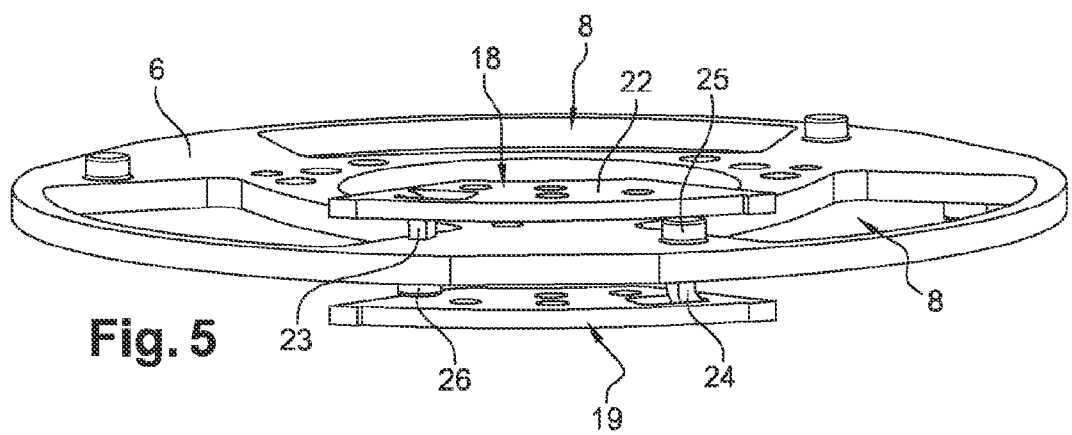
FIG. 5 is a perspective view of the web and of an added part, according to a variant embodiment of the invention.

FIG. 5 shows a variant embodiment in which tabs 23, 24 of added parts 18, 19 are formed by stamping and bending in middle zone 22, no longer at the extreme periphery but instead set back inward. Added parts 18, 19 moreover no longer have an inwardly curved radial edge.

Studs 25, 26 of web 6 are cylindrical and are placed radially on the paths of tabs 23, 24. Operation of the assemblage remains unchanged: tabs 23 come into abutment against studs 25 in the first extreme position when guide washers 10, 11 are rotating in the forward direction; and tabs 24 come into abutment against studs 26 in the second extreme position when guide washers 10, 11 are rotating in the reverse direction.

Figure 6:
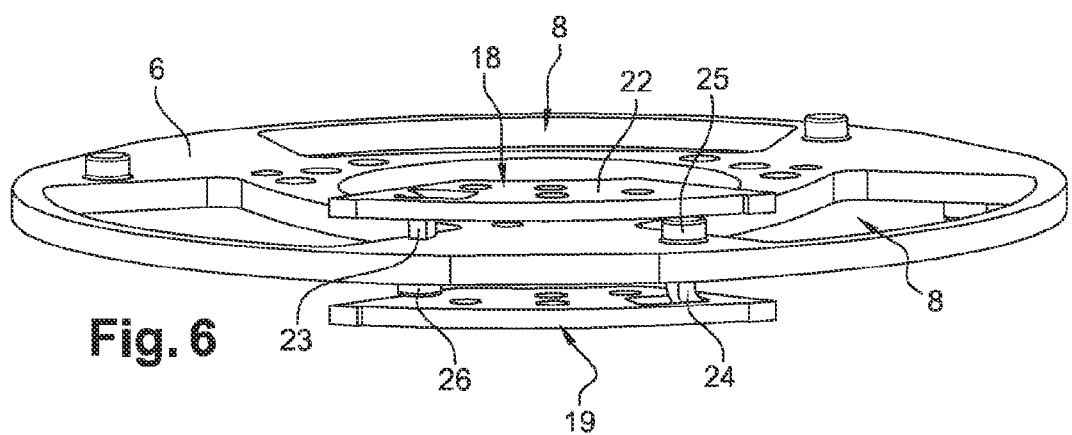
FIG. 6 is a view corresponding to FIG. 5, for another variant embodiment.

As a variant, the stops can be formed not by tabs as described above, but by thickened areas 23, 24 produced e.g. by machining (FIG. 6).

Figure 7:
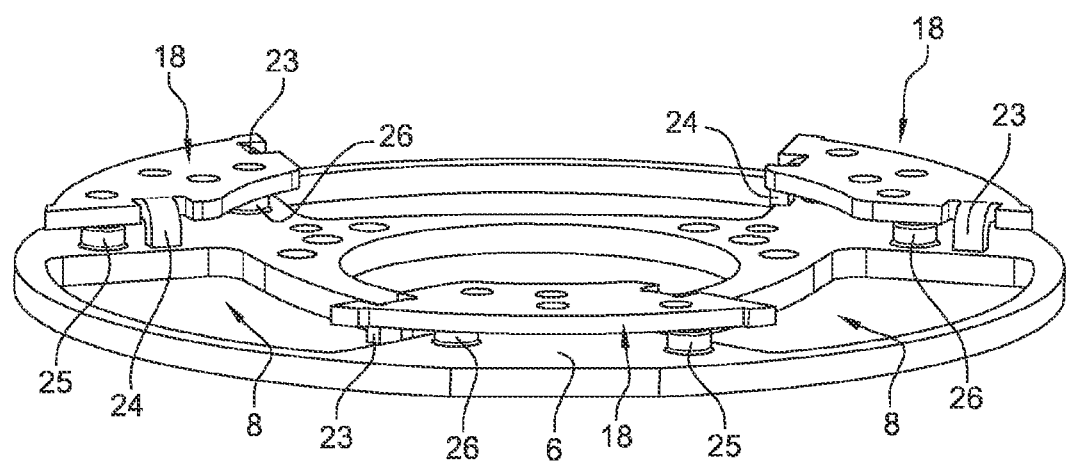
FIG. 7 is a perspective view of the web and of three added parts, according to another variant embodiment of the invention.

FIG. 7 shows another variant in which the added parts are all secured on the first guide washer 10, each added part 18 comprising a first tab 23 interacting with a protruding stud 25 of web 6 in order to limit deflection in the forward rotation direction of guide washers 10, 11, and a second tab 24, offset circumferentially and radially with respect to first tab 23 and interacting with another stud 25 protruding from web 6 in order to limit deflection in the reverse rotation direction.

The two tabs 23, 24, and also the two studs 25, 26, are located at different distances from central axis A, so that tabs 23 come into abutment not against studs 26 but only against studs 25, and vice versa.

In this variant, tabs 23, 24 are formed at the level of the radial edges of added parts 18.

The invention thus proposes a torsional damper having a maximum angular deflection between guide washers 10, 11 and annular web 6, thanks to the use of separate stops 25, 26 for the two opposite rotation directions. It likewise has a good service life, since added parts 18, 19, which are the parts subjected to greater wear, can be independently and easily replaced.

The invention claimed is:

1. A torsional damper (1) for a clutch, comprising:
a hub (2) coupled to a radial annular web (6);
two guide washers (10, 11) extending radially on either side of the annular web (6) and connected fixedly to one another and movably rotationally with respect to the hub (2) and the annular web (6); and
elastic members (9) and friction member (17) mounted axially between the guide washers (10, 11) and the annular web (6) in order to absorb and damp vibrations and rotational irregularities;
relative angular deflections of the guide washers (10, 11) and the annular web (6) being limited by stops (23, 24) of the guide washers (10, 11) that become supported against protruding parts (25, 26) of the annular web (6);
the guide washers and the annular web each comprise a first series of stops (23, 25) that mutually interact in order to limit the relative angular deflection in a first rotation direction, and a second series of stops (24, 26) that mutually interact in order to limit the relative angular deflection in a second rotation direction opposite to the first rotation direction, the stops of the first series (23, 25) being different from the stops of the second series (24, 26).

2. The damper according to claim 1, wherein the stops of the first series (23, 25) and the stops of the second series (24, 26) are formed by separate protruding elements.

3. The damper according to claim 2, wherein the separate protruding elements forming the stops of the first series (23, 25) and the stops of the second series (24, 26) extend substantially in the axial direction.

4. The damper according to claim 1, wherein the first series of stops (23, 25) and the second series (24, 26) of stops are arranged in such a way that an angular sector defined by the travel of the stops (23) of the guide washers (10, 11) of the first series with respect to the annular web (6) between the inactive position and a first extreme position, and an angular sector defined by the travel of the stops (24) of the guide washers (10, 11) of the second series with respect to the annular web (6) between the inactive position and a second extreme position, at least partially overlap.

5. The damper according to claim 1, wherein the stops (23, 24) are shaped onto parts (18, 19) that are added onto the guide washers (10, 11) or onto the annular web (6).

6. The damper according to claim 5, wherein the added parts (18, 19) are secured on at least one of the guide washers (10, 11), and the stops of the annular web are formed by the protruding parts of the annular web (6).

7. The damper according to claim 5, wherein one of the guide washers (10) carries all the added parts (18) having the stops (23) of the first series, and the other guide washer (11) carries all the added parts (19) having the stops (24) of the second series.

8. The damper according to claim 5, wherein the added parts (18) are all secured on the same guide washer (10), each added part (18) comprising a stop (23) of the first series and a stop (24) of the second series offset circumferentially and radially with respect to the stop (23) of the first series.

9. The damper according to claim 5, wherein the added parts (18, 19) are flat parts that are press-formed and have bent tabs (23, 24) forming the stops.

10. The damper according to claim 5, wherein the added parts (18, 19) are parts that are shaped by stamping or machining and have local thickened areas forming the stops (23, 24).

11. The damper according to claim 5, wherein the added parts (18, 19) have support surfaces for the elastic members of the damper.

12. The damper according to claim 11, wherein the added parts (18, 19) are in the shape of an angular sector whose radial edges form the support surfaces for the elastic members.

13. The damper according to claim 1, wherein the maximum angular deflection starting from an inactive position in one rotation direction (D) is different from the maximum angular deflection starting from the inactive position in the other rotation direction (R).

14. The damper according to claim 1, wherein the maximum angular deflection starting from an inactive position is on the order of 10° to 40°.

15. A torsional damper (1) for a clutch, comprising:
- a hub (2) coupled to a radial annular web (6) including protruding parts (25, 26);
- two guide washers (10, 11) extending radially on either side of the annular web (6) and connected fixedly to one another and movably rotationally with respect to the hub (2) and the annular web (6), the guide washers (10, 11) provided with stops (23, 24); and
- elastic members (9) and friction member (17) mounted axially between the guide washers (10, 11) and the annular web (6) in order to absorb and damp vibrations and rotational irregularities;

relative angular deflections of the guide washers (10, 11) and the annular web (6) being limited by the stops (23, 24) of the guide washers (10, 11) when abut against the corresponding protruding parts (25, 26) of the annular web (6);

the guide washers and the annular web each comprise a first series of stops (23, 25) that mutually interact in order to limit the relative angular deflection of the guide washers (10, 11) and the annular web (6) in a first rotation direction, and a second series of stops (24, 26) that mutually interact in order to limit the relative angular deflection of the guide washers (10, 11) and the annular web (6) in a second rotation direction opposite to the first rotation direction, the stops of the first series (23, 25) being different from the stops of the second series (24, 26);

the stops of the first series (23, 25) and the stops of the second series (24, 26) formed by separate protruding elements and the protruding parts (25, 26) extend substantially in the axial direction from axially opposite sides of the annular web (6).

* * * * *